United States Patent
Kang et al.

(10) Patent No.: US 9,658,492 B2
(45) Date of Patent: May 23, 2017

(54) DISPLAY PANEL

(71) Applicant: INNOLUX CORPORATION, Chu-Nan, Miao-Li County (TW)

(72) Inventors: Jung-Jui Kang, Chu-Nan (TW); Bo-Chin Tsuei, Chu-Nan (TW); Ming-Chien Sun, Chu-Nan (TW)

(73) Assignee: INNOLUX CORPORATION, Jhu-Nan (TW)

( * ) Notice: Subject to any disclaimer, the term of this patent is extended or adjusted under 35 U.S.C. 154(b) by 0 days.

(21) Appl. No.: 14/750,842

(22) Filed: Jun. 25, 2015

(65) Prior Publication Data

US 2016/0170270 A1    Jun. 16, 2016

(30) Foreign Application Priority Data

Dec. 10, 2014    (TW) .............................. 103142989 A

(51) Int. Cl.
*G02F 1/1337*    (2006.01)
*G02F 1/1362*    (2006.01)

(52) U.S. Cl.
CPC .. *G02F 1/133707* (2013.01); *G02F 1/136286* (2013.01); *G02F 2001/13373* (2013.01); *G02F 2001/133757* (2013.01); *G02F 2201/40* (2013.01)

(58) Field of Classification Search
CPC ................................. G02F 1/133707
USPC ....................... 349/123, 129, 130
See application file for complete search history.

(56) References Cited

U.S. PATENT DOCUMENTS

| | | | |
|---|---|---|---|
| 2009/0284703 A1* | 11/2009 | Shoraku | G02F 1/133753 349/129 |
| 2010/0201931 A1* | 8/2010 | Jang | G02F 1/133707 349/139 |
| 2010/0289975 A1* | 11/2010 | Nakagawa | G02F 1/133707 349/33 |
| 2011/0043741 A1* | 2/2011 | Hirato | G02F 1/133707 349/143 |

FOREIGN PATENT DOCUMENTS

| | | |
|---|---|---|
| JP | 2009109767 | 5/2009 |
| TW | 201115241 | 5/2011 |
| TW | 201209495 | 3/2012 |
| TW | 201346399 | 11/2013 |

* cited by examiner

*Primary Examiner* — Thanh-Nhan P Nguyen
(74) *Attorney, Agent, or Firm* — Liu & Liu

(57) ABSTRACT

A display panel is disclosed, which comprises: a first substrate with plural sub-pixel units disposed thereon; a first photo-alignment layer disposed on the first substrate and having at least two different alignment directions corresponding to one sub-pixel unit; and plural metal pads respectively corresponding to the sub-pixel units. When light passes through each sub-pixel, a dark line pattern is exhibited, comprising: a first main dark line disposed at an interface between two different alignment directions of the first photo-alignment layer; and a metal pad pattern corresponding to the metal pad and the first main dark line. Herein, a distance difference between an edge of the first dark line and an edge of the metal pad pattern at the same side is not identical to that between another edge of the first dark line and another edge of the metal pad pattern at another same side.

18 Claims, 17 Drawing Sheets

DISPLAY PANEL

CROSS REFERENCE TO RELATED APPLICATION

This application claims the benefits of the Taiwan Patent Application Serial Number 103142989, filed on Dec. 10, 2014, the subject matter of which is incorporated herein by reference.

BACKGROUND OF THE INVENTION

1. Field of the Invention

The present invention relates to a display panel with special dark line patterns to decrease the transmittance of the display panel in the dark state and increase the contrast ratio thereof.

2. Description of Related Art

In recent years, all the display devices are developed toward having small volume, thin thickness and light weight as the display techniques progresses. A liquid crystal display (LCD) device is a flat panel display device with a thin thickness, so a conventional cathode ray tube (CRT) display is gradually replaced by the LCD. Especially, the LCD can be applied to various fields. For example, the daily used devices such as cell phones, notebooks, video cameras, cameras, music players, navigation devices, and televisions are equipped with liquid crystal display (LCD) panels.

For the conventional LCD device, a liquid crystal layer is disposed between two electrodes, and voltage is applied onto the electrodes to control the tilt of liquid crystal molecules. Thus, it is possible to control light from a backlight module disposed below the LCD panel to pass or not pass through the liquid crystal layer, and the purpose of displaying can be achieved. In addition, the purpose of displaying different colors can be achieved through the pixel units.

As the development of the LCD panels with high display resolution, the transmittance thereof is one factor related to the display quality of the LCD panels. Hence, many manufacturers are desired to develop LCD panels having improved light transmittance to improve the display quality thereof.

Therefore, it is desirable to provide a display panel with improved transmittance to satisfy the requirement for high display quality.

SUMMARY OF THE INVENTION

The object of the present invention is to provide a display panel, wherein the transmittance thereof in a dark state is decreased to increase the contrast thereof.

The display panel of a first aspect of the present invention comprises: a first substrate with plural pixel units disposed thereon, wherein the pixel units respectively comprise plural sub-pixel units; a second substrate opposite to the first substrate; a first photo-alignment layer disposed on the pixel units and having at least two different alignment directions corresponding to one sub-pixel units; a liquid crystal layer disposed between the first substrate and the second substrate; and plural metal pads disposed on the first substrate, respectively having a protrusion portion, and respectively corresponding to the sub-pixel units. When light passes through the sub-pixel units, dark line patterns are exhibited, which respectively comprise: a first main dark line locating at an interface between two different alignment directions of the first photo-alignment layer and extending along a first direction, wherein two opposite edges of the first main dark line respectively have a first dark-line edge point and a second dark-line edge point at a cross-sectional line along a second direction perpendicular to the first direction; and a metal pad pattern corresponding to the first main dark line and having a first protrusion pattern extending along the first direction, wherein the first protrusion pattern corresponds to the protrusion portion of the metal pad, two opposite edges of the first protrusion pattern respectively have a first metal-pad-pattern edge point and a second metal-pad-pattern edge point at another cross-sectional line along the second direction, the first metal-pad-pattern edge point is relatively close to the first dark-line edge point, and the second metal-pad-pattern edge point is relatively close to the second dark-line edge point. Herein, a distance between elongation lines along the first direction on the basis of the first metal-pad-pattern edge point and the first dark-line edge point is defined as a first deviation distance, a distance between elongation lines along the first direction on the basis of the second metal-pad-pattern edge point and the second dark-line edge point is defined as a second deviation distance, and the first deviation distance is different from the second deviation distance.

In the display panel of the first aspect of the present invention, the pixel units may comprise a red pixel unit as a first sub-pixel unit, a blue pixel unit as a second sub-pixel unit, and a green pixel unit as a third sub-pixel unit, and the first deviation distance or the second deviation distance in the red pixel unit is larger than that in the blue pixel unit.

In the display panel of the first aspect of the present invention, the pixel units may comprise a red pixel unit as a first sub-pixel unit, a blue pixel unit as a second sub-pixel unit, and a green pixel unit as a third sub-pixel unit, and the first deviation distance or the second deviation distance in the red pixel unit is larger than that in the green pixel unit.

In the display panel of the first aspect of the present invention, the pixel units may further comprise a yellow pixel unit as a fourth sub-pixel unit, and the first deviation distance or the second deviation distance in the red pixel unit is larger than that in the yellow pixel unit.

In the display panel of the first aspect of the present invention, the metal pad patterns corresponding to the sub-pixel units respectively are cross patterns, uppercase T patterns or uppercase L patterns.

In the display panel of the first aspect of the present invention, the metal pad pattern corresponding to at least one sub-pixel units further has a second protrusion pattern extending along the second direction.

In the display panel of the first aspect of the present invention, preferably, all the metal pad patterns corresponding to the sub-pixel units may further have second protrusion patterns extending along the second direction, respectively.

In the display panel of the first aspect of the present invention, an area of each metal pad pattern may be respectively 5~15% of an area of the sub-pixel unit corresponding thereto.

The display panel of the first aspect of the present invention may further comprise a second photo-alignment layer disposed on the pixel units, wherein the first photo-alignment layer has an alignment direction identical to the first direction and another alignment direction opposite to the first direction, and the second photo-alignment layer has an alignment direction identical to the second direction and another alignment direction opposite to the second direction.

In addition, a second aspect of the present invention further provides another display panel, comprising: a first substrate with plural pixel units disposed thereon, wherein the pixel units respectively comprise plural sub-pixel units; a second substrate opposite to the first substrate; a first photo-alignment layer disposed on the pixel units and having at least two different alignment directions corresponding to one sub-pixel units; a liquid crystal layer disposed between the first substrate and the second substrate; and plural metal pads disposed on the first substrate, respectively having a protrusion portion, and respectively corresponding to the sub-pixel units. When light passes through the sub-pixel units, dark line patterns are exhibited, which respectively comprise: a first main dark line locating at an interface between two different alignment directions of the first photo-alignment layer and extending along a first direction, wherein the first main dark line has a first edge and a second edge opposite to the first edge, and both the first edge and the second edge extend along the first direction; and a metal pad pattern corresponding to the first main dark line and having a first protrusion pattern extending along the first direction, wherein the first protrusion pattern corresponds to the protrusion portion of the metal pad, the first protrusion pattern has a third edge and a fourth edge opposite to the third edge, both the third edge and the fourth edge extend along the first direction, the third edge is relatively close to the first edge, the fourth edge is relatively close to the second edge, a first distance between the first edge and the third edge along a second direction perpendicular to the first direction is different from a second distance between the second edge and the fourth edge along the second direction.

In the display panel of the second aspect of the present invention, the pixel units may comprise a red pixel unit as a first sub-pixel unit, a blue pixel unit as a second sub-pixel unit, and a green pixel unit as a third sub-pixel unit, and the first distance or the second distance in the red pixel unit is larger than that in the blue pixel unit.

In the display panel of the second aspect of the present invention, the pixel units may comprise a red pixel unit as a first sub-pixel unit, a blue pixel unit as a second sub-pixel unit, and a green pixel unit as a third sub-pixel unit, and the first distance or the second distance in the red pixel unit is larger than that in the green pixel unit.

In the display panel of the second aspect of the present invention, the pixel units may further comprise a yellow pixel unit as a fourth sub-pixel unit, and the first distance or the second distance in the red pixel unit is larger than that in the yellow pixel unit.

In the display panel of the second aspect of the present invention, the metal pad patterns corresponding to the sub-pixel units respectively are cross patterns, uppercase T patterns or uppercase L patterns.

In the display panel the second aspect of the present invention, the metal pad pattern corresponding to at least one sub-pixel units may further have a second protrusion pattern extending along the second direction.

Preferably, in the display panel of the second aspect of the present invention, all the metal pad patterns corresponding to the sub-pixel units may further have second protrusion patterns extending along the second direction, respectively.

In the display panel of the second aspect of the present invention, an area of each metal pad pattern may be respectively 5~15% of an area of the sub-pixel unit corresponding thereto.

The display panel of the second aspect of the present may further comprise a second photo-alignment layer disposed on the pixel units, wherein the first photo-alignment layer has an alignment direction identical to the first direction and another alignment direction opposite to the first direction, and the second photo-alignment layer has an alignment direction identical to the second direction and another alignment direction opposite to the second direction.

As mentioned above, since metal pads with protrusion portions are disposed on the first substrate in the display panel of the present invention, metal pad patterns with first protrusion patterns corresponding thereto are formed when light passes through the sub-pixel units of the display panel. Thus, when light does not passes through sub-pixel units and the display panel is present in a dark state, the brightness thereof can further be decreased, resulting in the contrast ratio thereof enhanced. Meanwhile, the color of the sub-pixel units can further be changed by adjusting the first/second deviation distance or the first/second distance, and thus the display color of the display panel can be modified toward cold color or warm color.

Other objects, advantages, and novel features of the invention will become more apparent from the following detailed description when taken in conjunction with the accompanying drawings.

DETAILED DESCRIPTION OF THE PREFERRED EMBODIMENT

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

Figure 1A:
FIG. 1A is a schematic view showing a display device according to one preferred embodiment of the present invention.

FIG. 1A is a cross-sectional view showing a display device in one preferred embodiment of the present invention. The display device of the present embodiment comprises: a display panel 10; and a backlight module 20 disposed under the display panel 10 to provide light passing through the display panel 10.

Figure 1B:
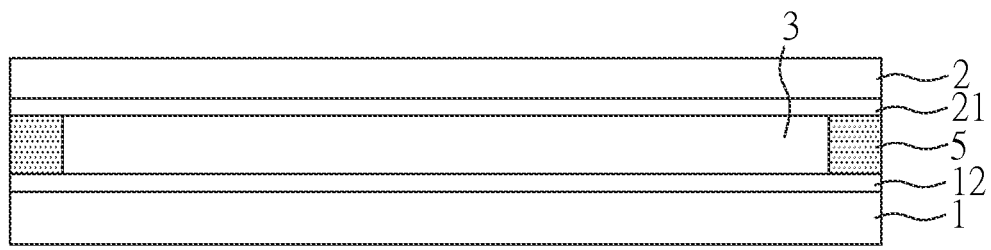
FIG. 1B is a schematic view showing a display panel according to one preferred embodiment of the present invention.

As shown in FIG. 1B, the display panel of the present embodiment comprises: a first substrate 1 with a first photo-alignment layer 12 disposed thereon; a second substrate 2 opposite to the first substrate 1 and having a second photo-alignment layer 21 disposed thereon, wherein the second photo-alignment layer 21 is opposite and faces to the first photo-alignment layer 12; a sealant frame 5 disposed between the first substrate 1 and the second substrate 2 and locating on peripheries of the first substrate 1 and the second substrate 2; and a liquid crystal layer 3 disposed in a space between the first substrate 1 and the second substrate 2. In the present embodiment, thin film transistor (TFT) units (not shown in the figure) are disposed on the first substrate 1, and a color filter layer (not shown in the figure) is disposed on the second substrate 2. Thus, the first substrate 1 is a TFT substrate and the second substrate 2 is a color filter (CF) substrate. However, in other embodiment of the present invention, the color filter layer (not shown in the figure) can be alternatively disposed on the first substrate 1; and in this case, the first substrate 1 is a color filter on array (COA) substrate. Hereinafter, the structure of the first substrate 1 of the present embodiment is described below.

Figure 2A:
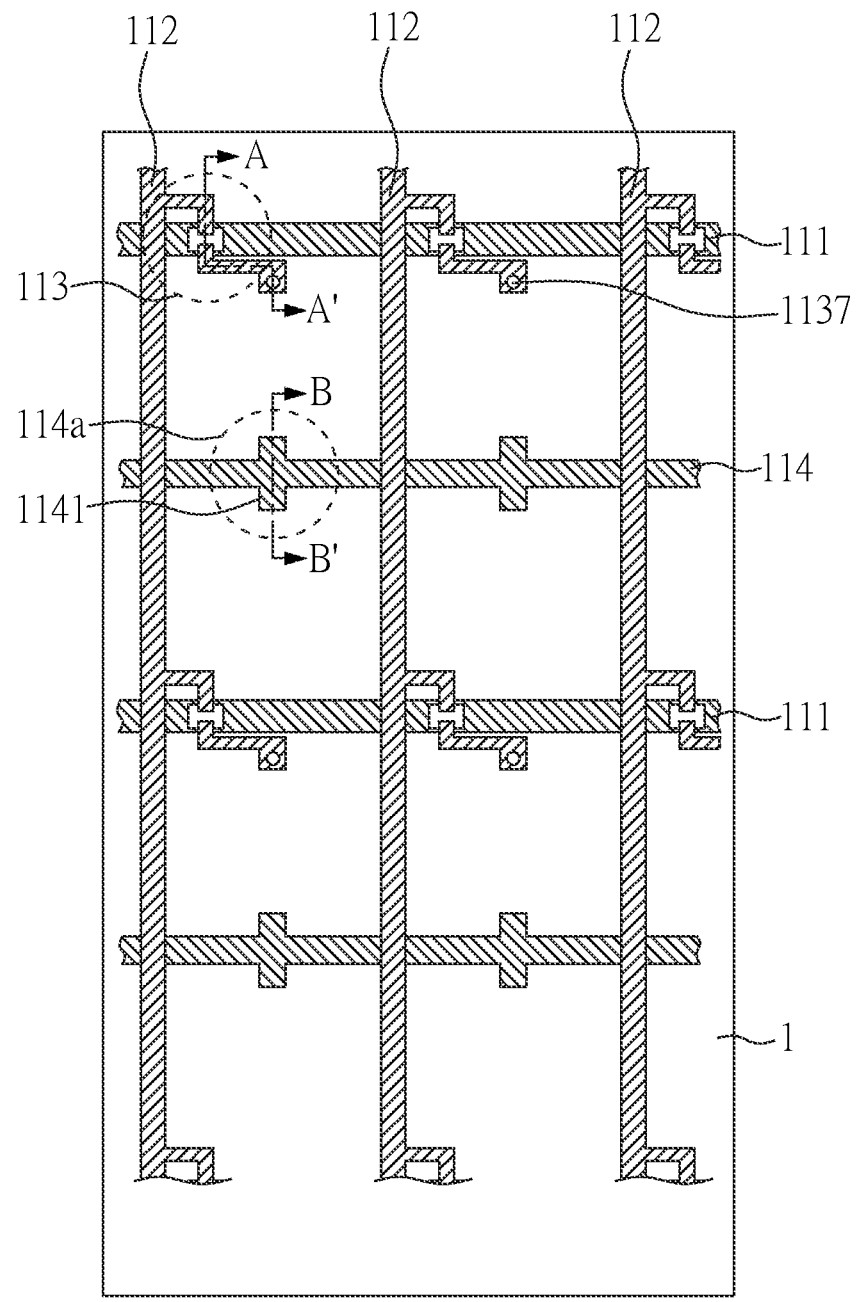
FIGS. 2A and 2B are schematic views showing thin film transistor (TFT) substrates according to two preferred embodiments of the present invention, respectively.
Figure 3A:
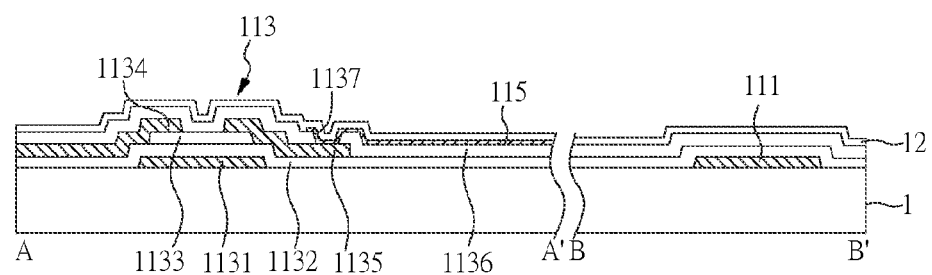
FIGS. 3A and 3B are cross-sectional views of TFT substrates along an A-A' line and a B-B' line shown in FIGS. 2A and 2B, respectively.

FIGS. 2A and 3A are a schematic view and a cross-sectional view of the TFT substrate of the display panel in one preferred embodiment of the present invention. The TFT substrate comprises: a first substrate 1 with scan lines 111, data lines 112, TFT units 113, pixel electrodes 115 and capacitor electrodes 114 formed thereon. Herein, each pixel electrode 115 is disposed between two adjacent scan lines 111 and two adjacent data lines 112 to form a sub-pixel unit. In FIG. 2A, one pixel unit is shown, which comprises four sub-pixel units. However, in other embodiment, one pixel unit is not limited to comprise four sub-pixel units, and can comprise, for example, three sub-pixel units. In the present embodiment, one sub-pixel unit comprises a TFT unit 113, a pixel electrode 115 and a capacitor electrode 114, and the pixel electrode 115 electrically connects to the TFT unit 113 through a contacting via 1137. In addition, in the sub-pixel unit, the capacitor electrode 114 is disposed on the first substrate 1 and comprises a metal pad 114a with a first protrusion portion 1141, presenting in a cross pattern.

As shown in FIGS. 2A and 3A, for preparing the TFT substrate of the present embodiment, a gate electrode 1131 and a scan line 111 are formed on the first substrate 1. Next, an insulating layer 1132 (also called as a gate insulating layer) is formed on the first substrate 1, the gate electrode 1131 and the scan line 111, and then a semiconductor layer 1133 corresponding to the gate electrode 1131 is formed on the insulating layer 1132. A source electrode 1134 and a drain electrode 1135 are formed on the semiconductor layer 1133, and a data line 112 is also formed on the insulating layer 1132 to finish the process for preparing the data line 112, the scan line 111 and the TFT unit 113 of the present embodiment. Finally, a protection layer 1136 with a contacting via 1137 is formed, and a pixel electrode 115 is then formed on the protection layer 1136 and in the contacting via 1137 to accomplish the TFT substrate of the present embodiment.

Herein, the gate electrode 1131, the scan line 111, the capacitor electrode 114, the source electrode 1134, the drain electrode 1135 and the data line 112 can be made of any conductive material generally used in the art, such as metals, alloys, metal oxides, metal nitric oxides, or other known electrode materials. Preferably, metals are used, but the present invention is not limited thereto. In addition, the gate electrode 1131, the scan line 111, the capacitor electrode 114, the source electrode 1134, the drain electrode 1135 and the data line 112 is not limited to be made of one single material, and can have composite structures formed by several materials sequentially laminated. Furthermore, the first substrate 1 and the second substrate 2 can be made of any substrate material generally used in the art, such as glass, plastic, and other flexible materials. The insulating layer 1132 and the protection layer 1136 can be made of known insulating materials used in the art; the semiconductor layer 1133 can be made of known semiconductor materials used in the art; and the pixel electrode 115 can be made of transparent conductive materials generally used in the art for preparing electrodes, such as ITO, IZO and ITZO.

Figure 2B:
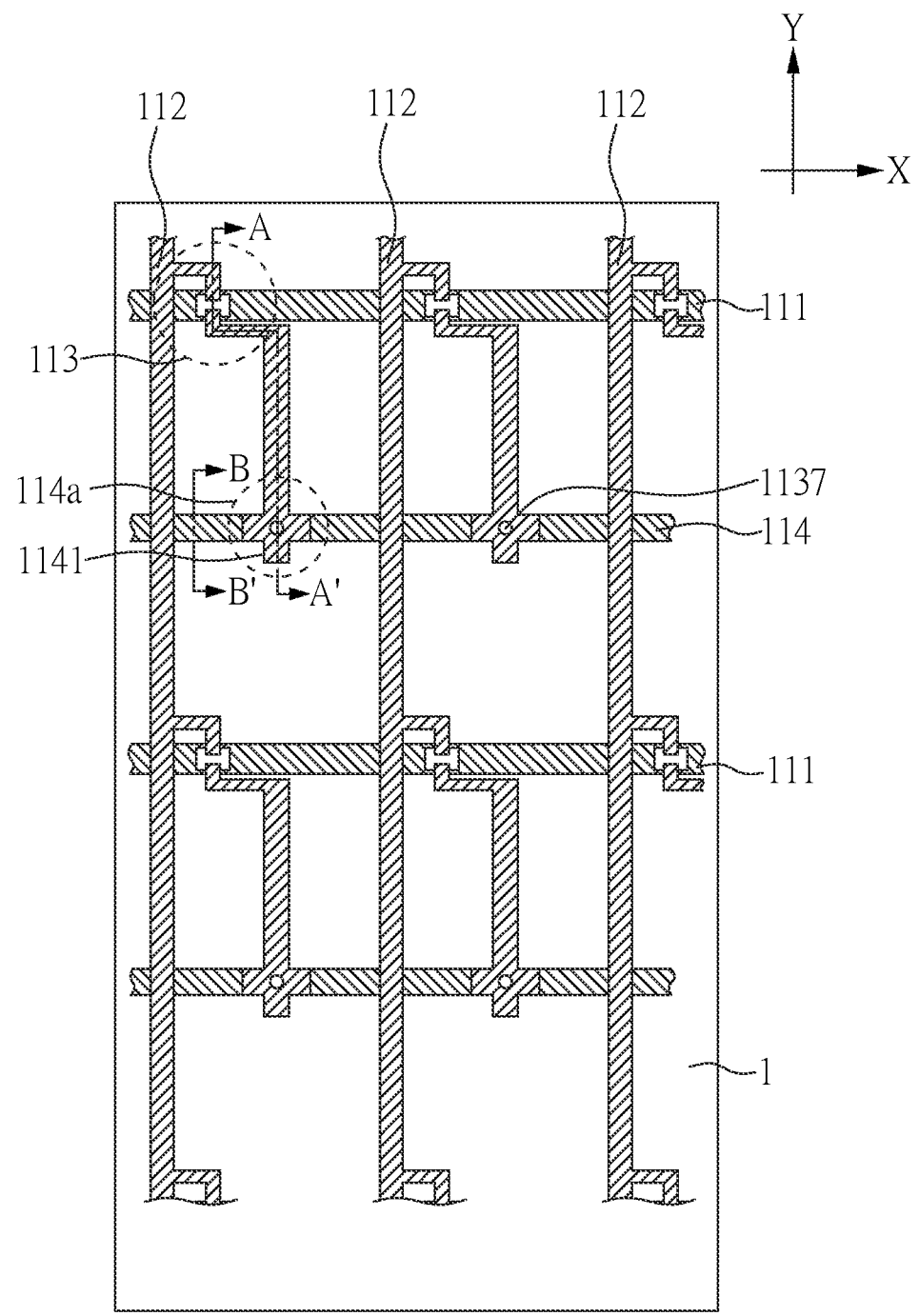
Figure 3B:
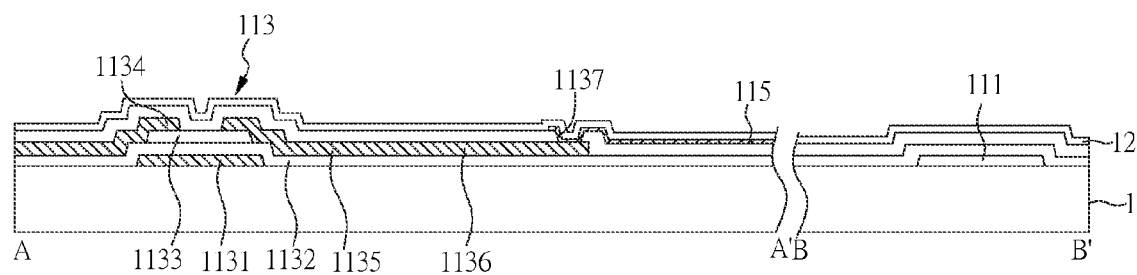

FIGS. 2B and 3B are a schematic view and a cross-sectional view of the TFT substrate of the display panel in another preferred embodiment of the present invention. The structure of the TFT substrate shown in FIGS. 2B and 3B is similar to that shown in FIGS. 2A and 3A, except that the drain electrode 1135 of the TFT unit 113 in the present embodiment extends toward the capacitor electrode 114, and thus the contacting via 1137 corresponds to and is disposed on the capacitor electrode 114. In addition, in the present embodiment, the drain electrode 1135 further comprises a metal pad 114a with a first protrusion portion 1141, presenting in a cross pattern.

Figure 4A:
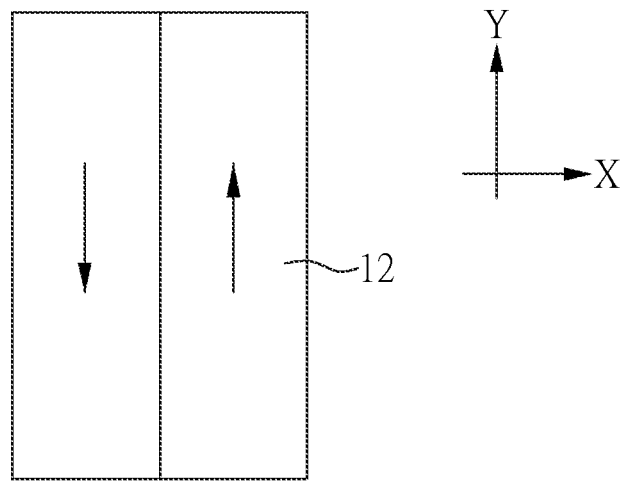
FIGS. 4A and 4B are schematic views showing alignment directions of a first photo-alignment layer and a second photo-alignment layer according to one preferred embodiment of the present invention.
Figure 4B:
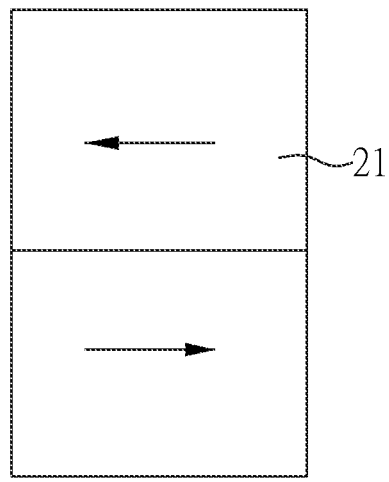

As shown in FIGS. 1B, 3A and 3B, a first photo-alignment layer 12 is further disposed on the TFT substrate; and a second photo-alignment layer 21 is further disposed on the second substrate 2 (as shown in FIG. 1B). In one sub-pixel unit, alignment directions of the first photo-alignment layer 12 and the second photo-alignment layer 21 are schematically shown in FIGS. 4A and 4B. As shown in FIG. 4A, the first photo-alignment layer 12 has an alignment direction identical to the first direction Y and another alignment direction opposite to the first direction Y; and as shown in FIG. 4B, the second photo-alignment layer has an alignment direction identical to the second direction X and another alignment direction opposite to the second direction X.

Figure 5:
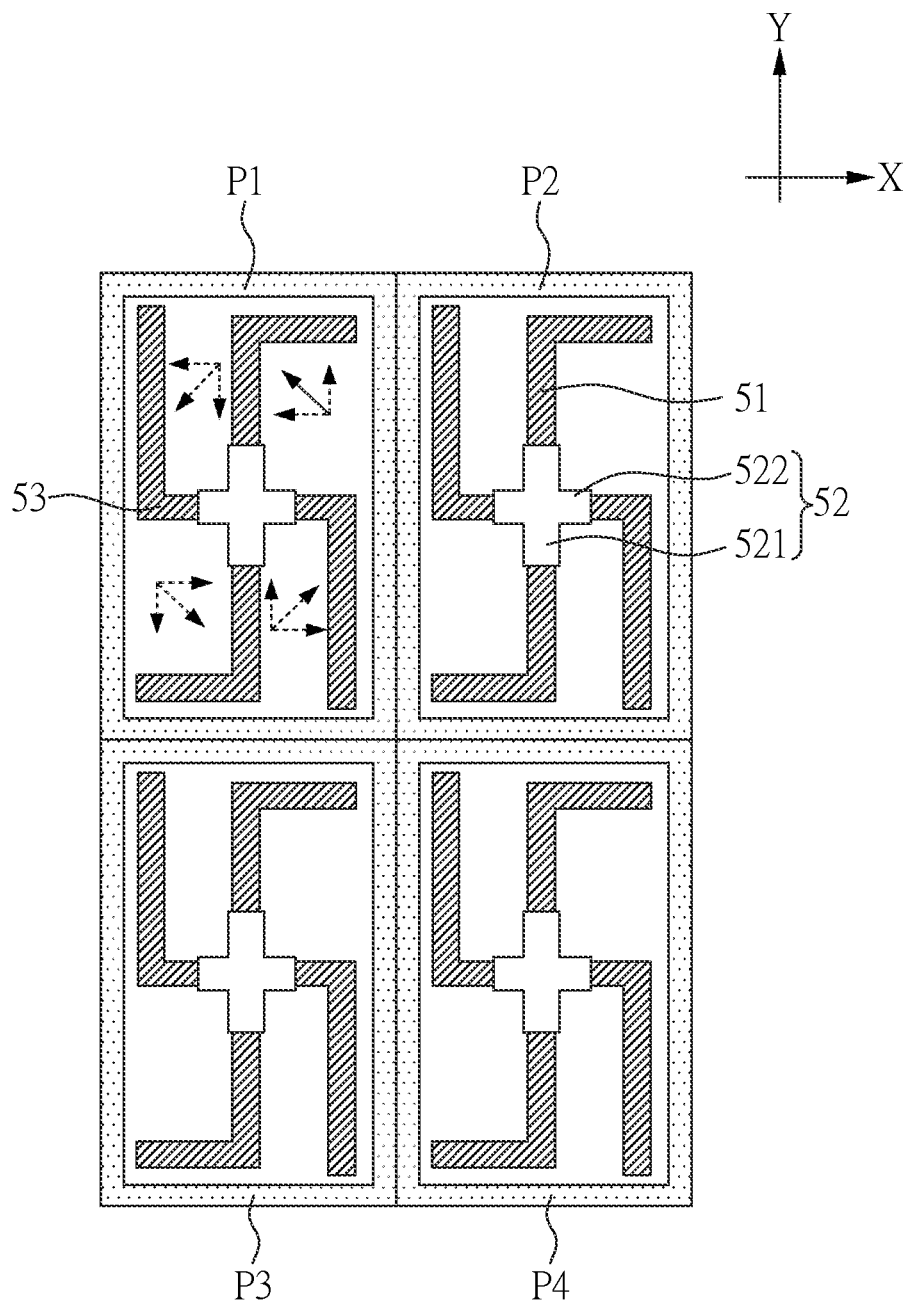
FIG. 5 is a schematic view showing dark line patterns according to one preferred embodiment of the present invention.

Hence, as shown in FIGS. 1 and 5, voltage applied to the pixel electrode (not shown in the figure) is controlled to make the display panel presenting in a bright or dark state. In the bright state, when light emitting from the backlight module 20 show in FIG. 1 passes through the sub-pixel units P1, P2, P3, P4, the alignment directions of the first photo-alignment layer 12 and the second photo-alignment layer 21 influence the tilt directions of liquid crystals disposed therebetween, and thus dark line patterns having swastika shapes (as shown in FIG. 5) are observed in the display panel. As shown in FIGS. 4A and 5, each dark line pattern respectively comprises: a first main dark line 51 locating at an interface between two different alignment directions of the first photo-alignment layer 12 and extending along a first direction Y; and a metal pad pattern 52 corresponding to the first main dark line 51 and the metal pad 114a shown in FIGS. 2A and 2B, and having a first protrusion pattern 521 extending along the first direction Y, wherein the first protrusion pattern 521 corresponds to the first protrusion portion 1141 of the metal pad 114a. In addition, the metal pad pattern 52 may further has a second protrusion pattern 522 extending along the second direction X. Herein, in each sub-pixel units P1, P2, P3, P4, an area of each metal pad pattern 52 is respectively 5~15% of an area of the sub-pixel unit P1, P2, P3, P4 corresponding thereto.

Figure 6:
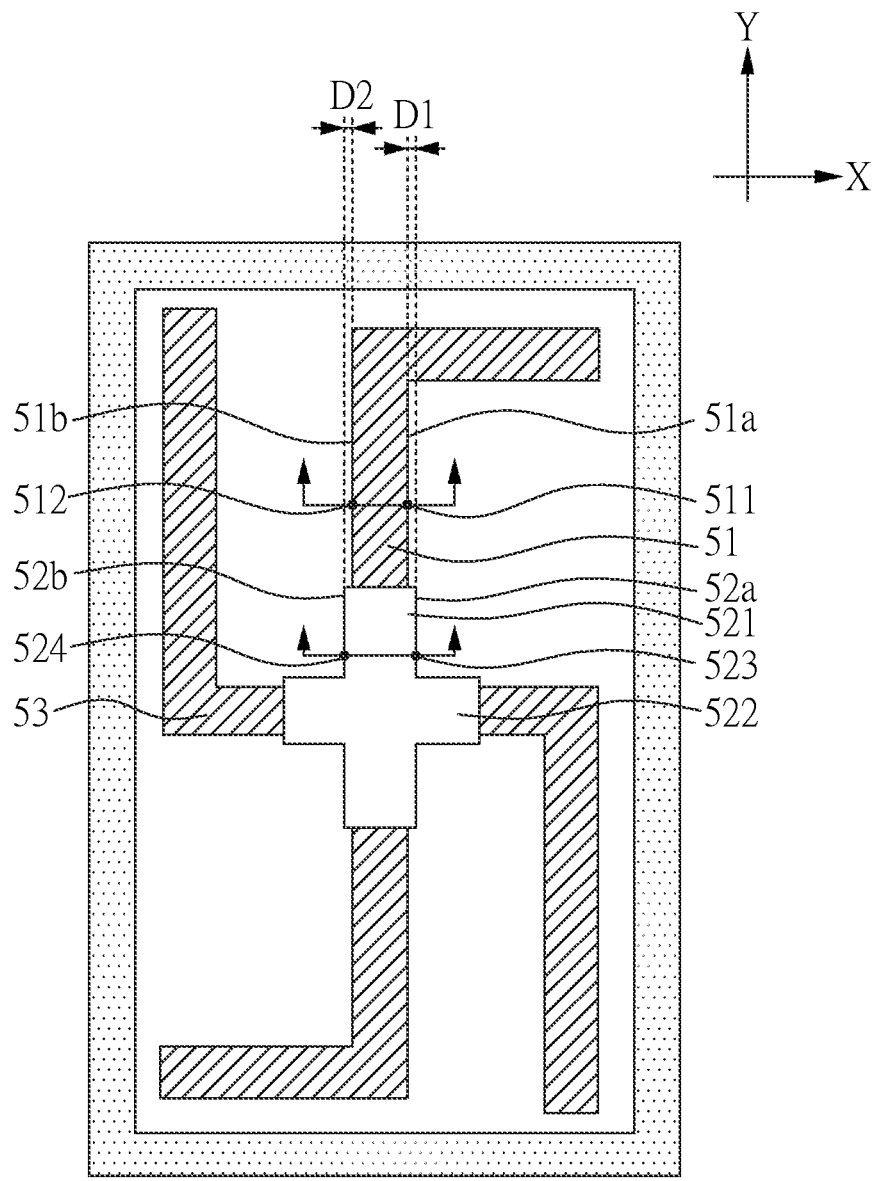
FIG. 6 is an enlarging view showing parts of a dark line pattern according to one preferred embodiment of the present invention.

FIG. 6 is an enlarging view of one sub-pixel unit in the present embodiment. In the display panel of the present embodiment, the first main dark line 51 has a first edge 51a and a second edge 51b opposite to the first edge 51a, and both the first edge 51a and the second edge 51b extend along the first direction Y. Herein, the first edge 51a and the second edge 51b of the first main dark line 51 respectively have a first dark-line edge point 511 and a second dark-line edge point 512 at a cross-sectional line along a second direction X perpendicular to the first direction Y. On the other hand, the first protrusion pattern 521 has a third edge 52a and a fourth edge 52b opposite to the third edge 52a, and both the third edge 52a and the fourth edge 52b extend along the first direction Y. Herein, the third edge 52a is relatively close to the first edge 51a, and the fourth edge 52b is relatively close to the second edge 51b. In addition, the third edge 52a and the fourth edge 52b of the first protrusion pattern 521 respectively have a first metal-pad-pattern edge point 523 and a second metal-pad-pattern edge point 524 at another cross-sectional line along the second direction X, the first metal-pad-pattern edge point 523 is relatively close to the first dark-line edge point 511, and the second metal-pad-pattern edge point 524 is relatively close to the second dark-line edge point 512.

Herein, a first distance D1 between the first edge 51a and the third edge 52a along the second direction X is different from a second distance D2 between the second edge 51b and the fourth edge 52b along the second direction X. In other words, a distance between elongation lines along the first direction Y on the basis of the first metal-pad-pattern edge point 523 and the first dark-line edge point 511 is defined as a first deviation distance (as indicated by the first distance D1), a distance between elongation lines along the first direction Y on the basis of the second metal-pad-pattern edge point 524 and the second dark-line edge point 512 is defined as a second deviation distance (as indicated by the second distance D2), and the first deviation distance is different from the second deviation distance. In further another word, in the case that the cross-sectional line along the second direction X on the first edge 51a and the second edge 51b of the first main dark line 51 is overlapped with the other cross-sectional line along the second direction X on the third edge 52a and the fourth edge 52b of the first protrusion pattern 521, a distance after overlapping the cross-sectional lines between the first dark-line edge point 511 and the first metal-pad-pattern edge point 523 is defined as a first deviation distance, a distance overlapping the cross-sectional lines between second dark-line edge point 512 and the second metal-pad-pattern edge point 524 is defined as a second deviation distance, and the first deviation distance is different from the second deviation distance.

To specifically defined the first deviation distance and the second deviation distance, a full width at half maximum (FWHM) of the first main dark line 51 and the metal pad pattern 52 is used. Herein, the term "FWHM" means a bandwidth obtained by half the difference between the wave trough and the wave crest close to the wave trough. In this case, two corresponding edge points of the wave of the dark lines can be obtained based on this definition. Hence, in the display panel of the present embodiment, the first dark-line edge point 511, the second dark-line edge point 512, the first metal-pad-pattern edge point 523 and the second metal-pad-pattern edge point 524 are defined by the FWHMs of the waves of the first main dark line 51 and the first protrusion pattern 521. Herein, the waves thereof are measured by the following method. During the examination, the display panel is present in white, the images at a maximum brightness thereof are taken by CCD, and the cross-shaped dark lines in the centers of the images are analyzed to obtain the brightness changes in a grey scale, which is further drawn into wave graphs. If there are noises in the brightness changes in a grey scale, a Fourier transfer method or a moving average method is used to remove the noises.

FIGS. 7A to 7D are diagrams showing measured brightness of first main dark lines and metal pad patterns in red, green, blue and yellow sub-pixel units of the display panel according to Embodiment 1 of the present invention, wherein the TFT substrate used in the display panel of the present embodiment is shown in FIG. 2B, and the waves of the first main dark lines and metal pad patterns are measured by the aforementioned process. Herein, the relative positions indicated in X axis refers to the positions of the first protrusion pattern 521 and the first main dark line 51 along the second direction X shown in FIG. 6. More specifically, taking FIG. 7A as an example, the most left end of the cross-sectional line of the first protrusion pattern 521 is corresponded to the relative position 1 indicated in X axis of FIG. 7A, the most left end of the cross-sectional line of the first main dark line 51 is also corresponded to the relative position 1 indicated in X axis thereof, and a connecting line of the most left ends of the cross-sectional lines of both the first protrusion pattern 521 and the first main dark line 51 is parallel to the first direction Y.

Figure 7A:
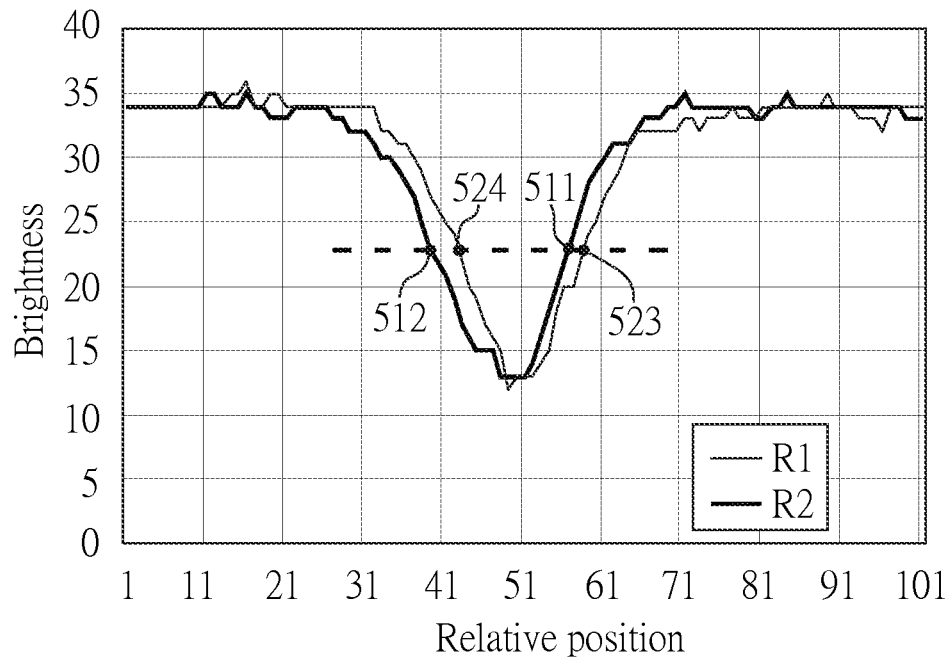
FIGS. 7A to 7D are diagrams showing measured brightness of first main dark lines and metal pad patterns in red, green, blue and yellow sub-pixel units according to Embodiment 1 of the present invention.
Figure 7B:
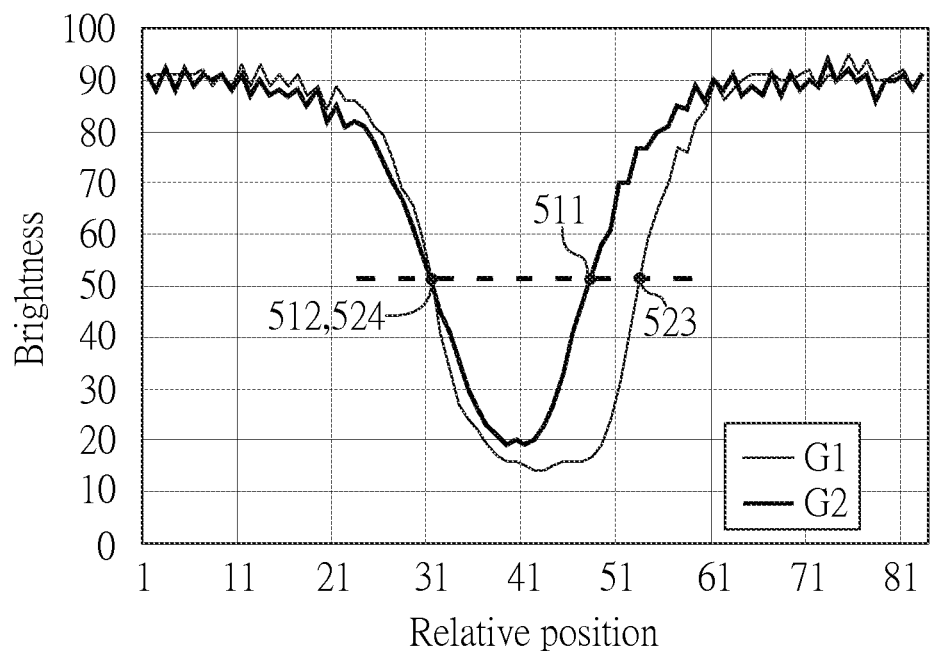
Figure 7C:
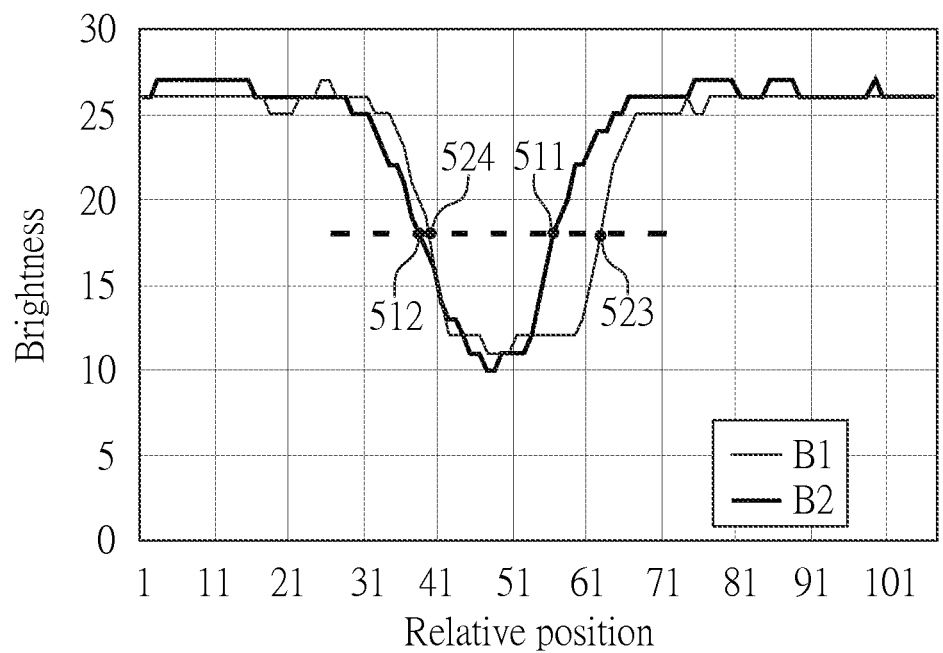
Figure 7D:
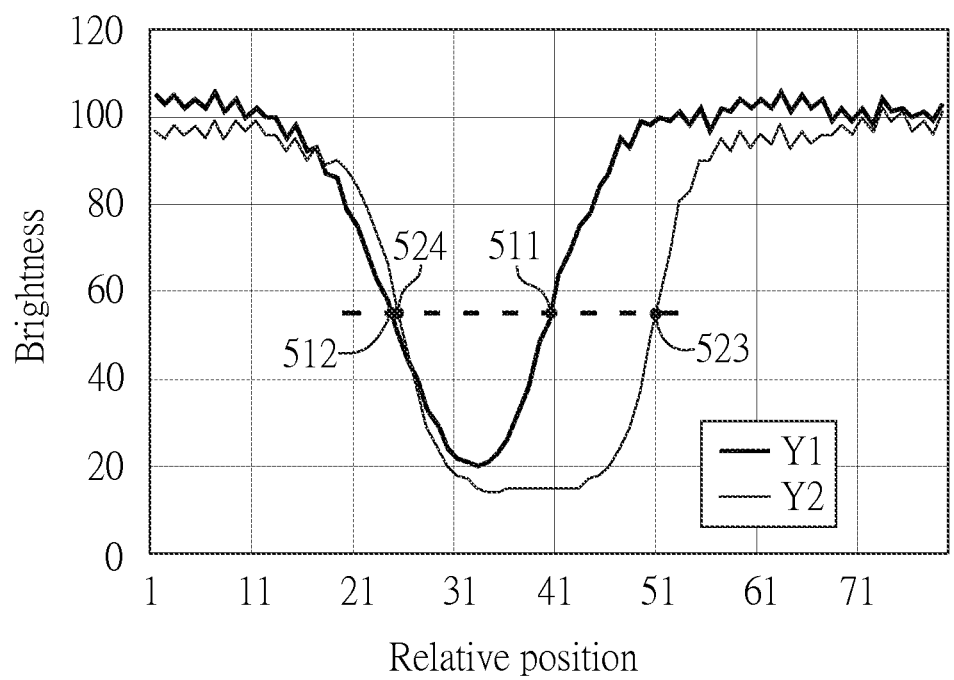
Figure 8A:
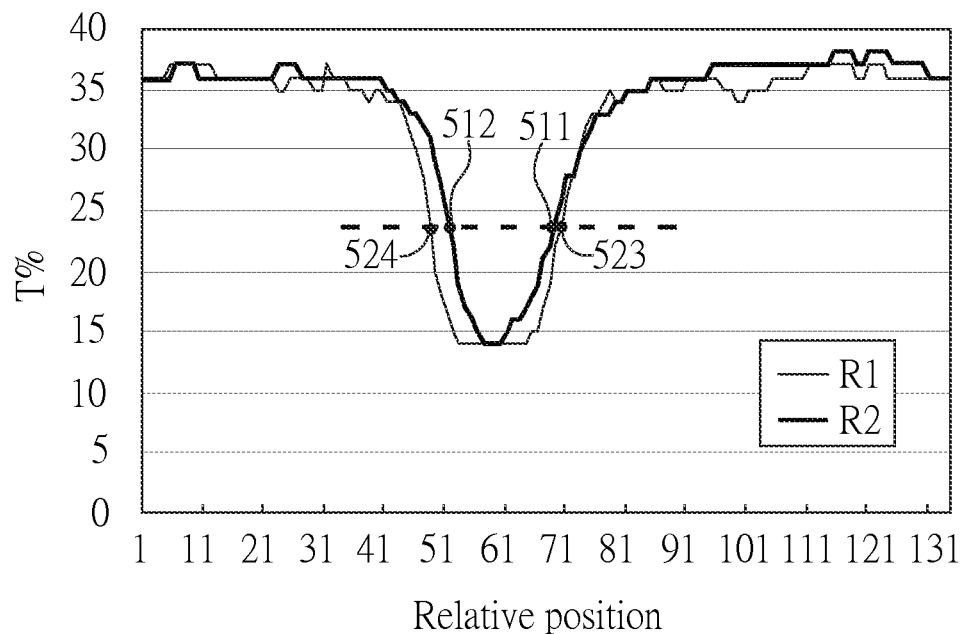
FIGS. 8A to 8D are diagrams showing measured transmittance of first main dark lines and metal pad patterns in red, green, blue and yellow sub-pixel units according to Embodiment 2 of the present invention.
Figure 8B:
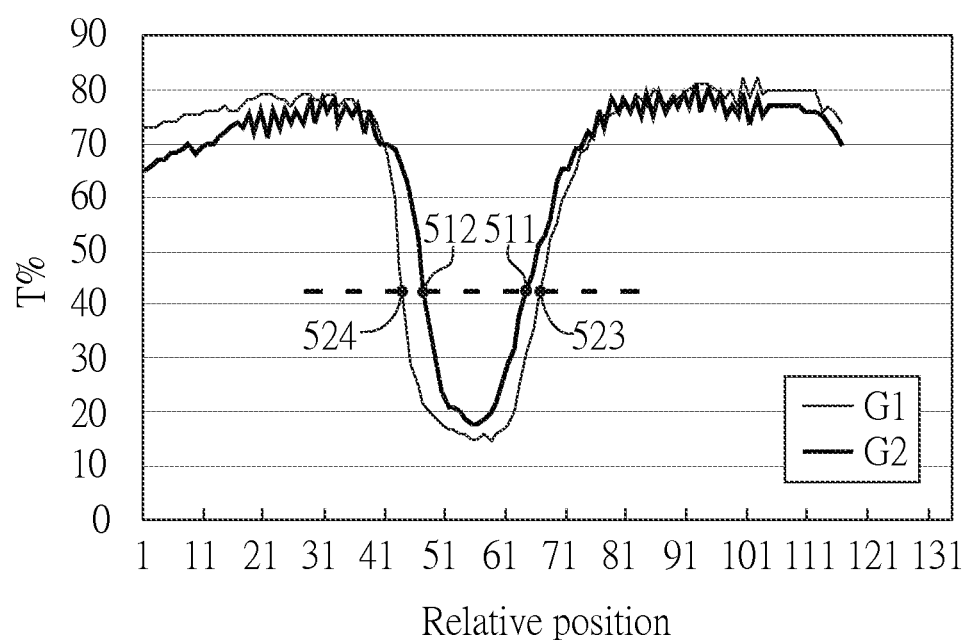
Figure 8C:
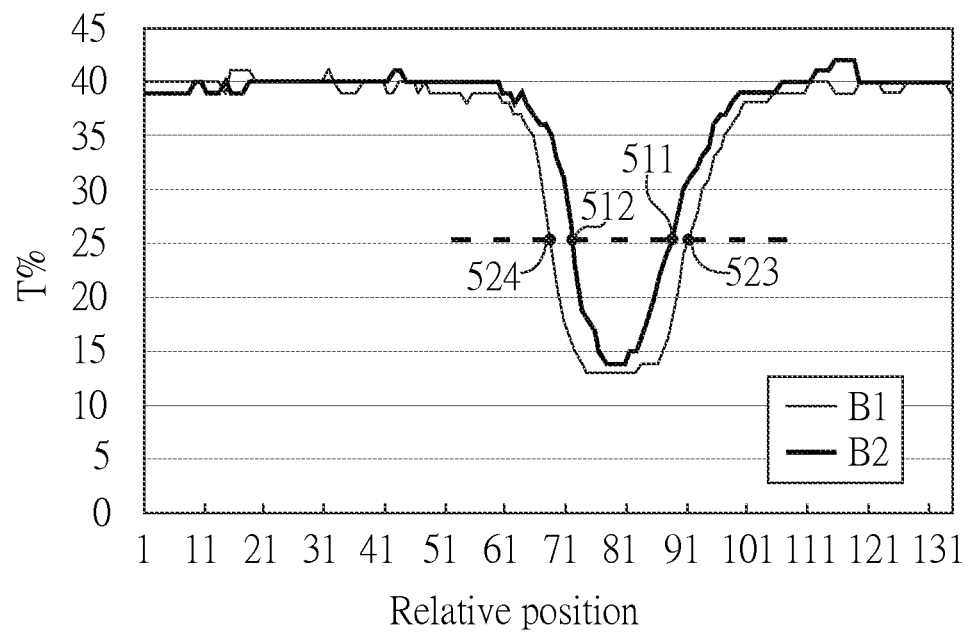
Figure 8D:
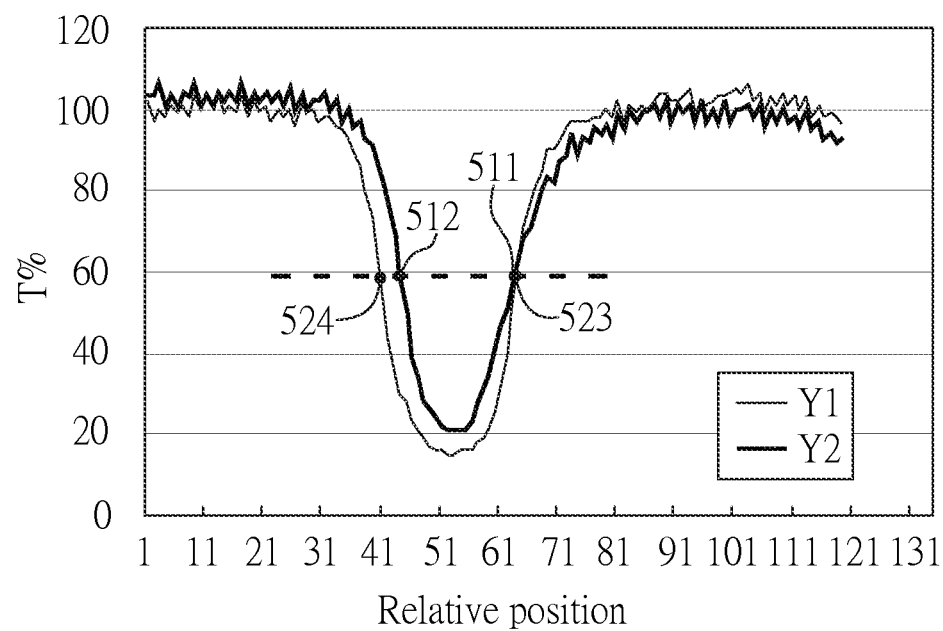
Figure 9A:
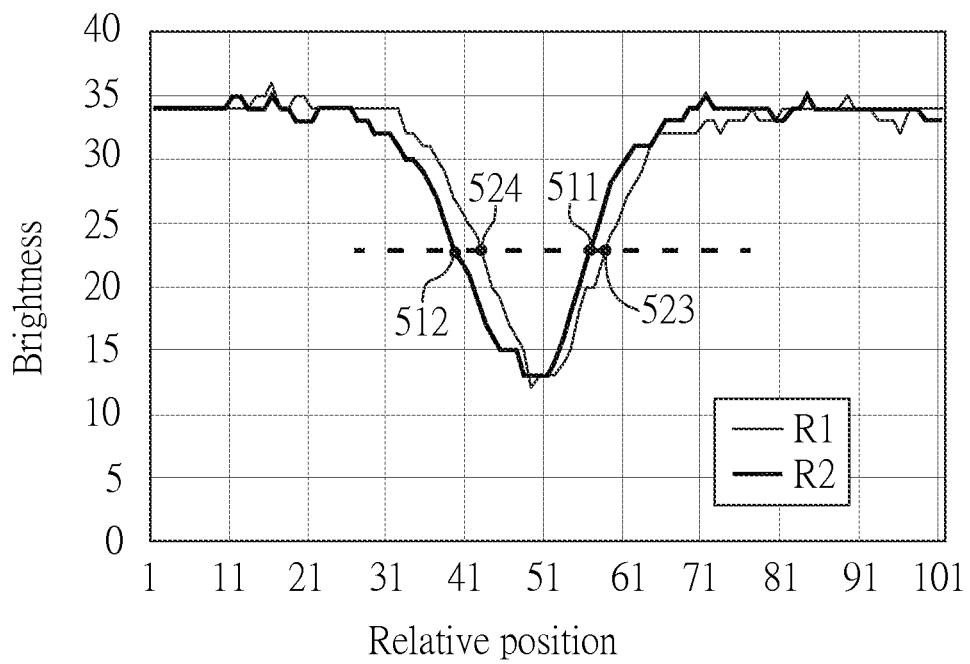
FIGS. 9A to 9D are diagrams showing measured brightness of first main dark lines and metal pad patterns in red, green, blue and yellow sub-pixel units according to Embodiment 3 of the present invention.
Figure 9B:
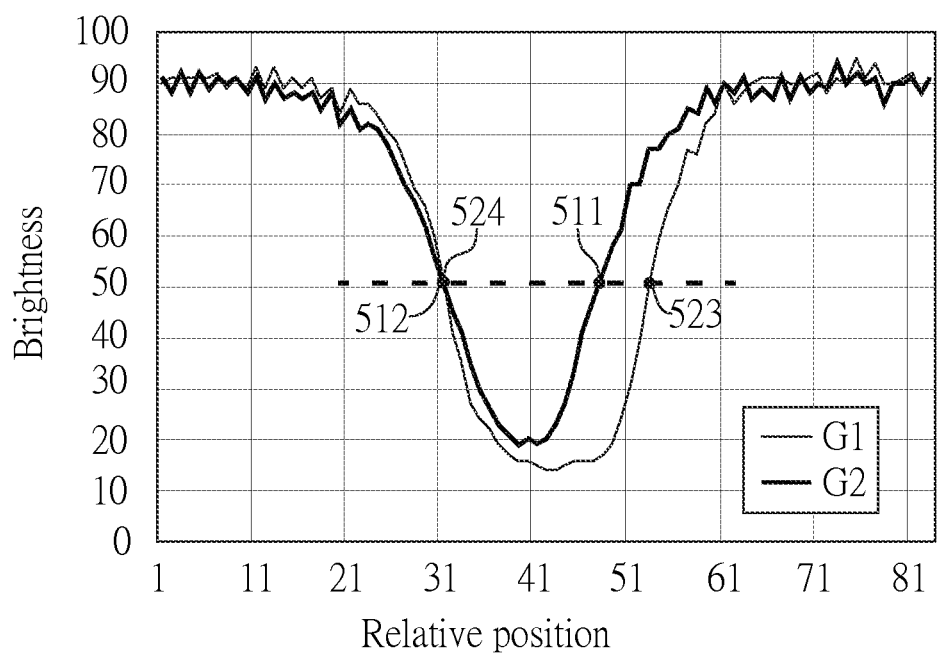
Figure 9C:
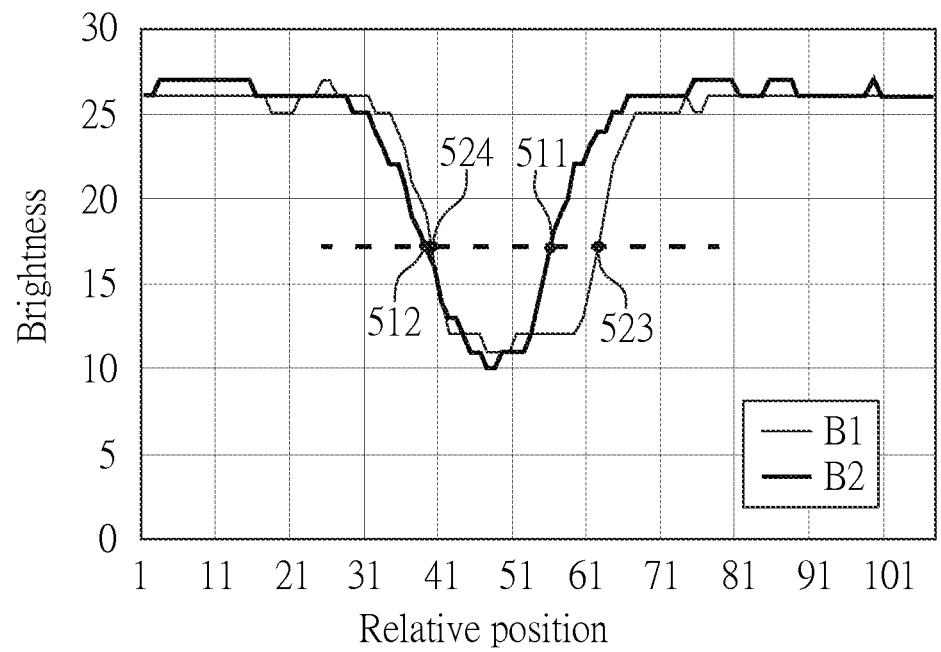
Figure 9D:
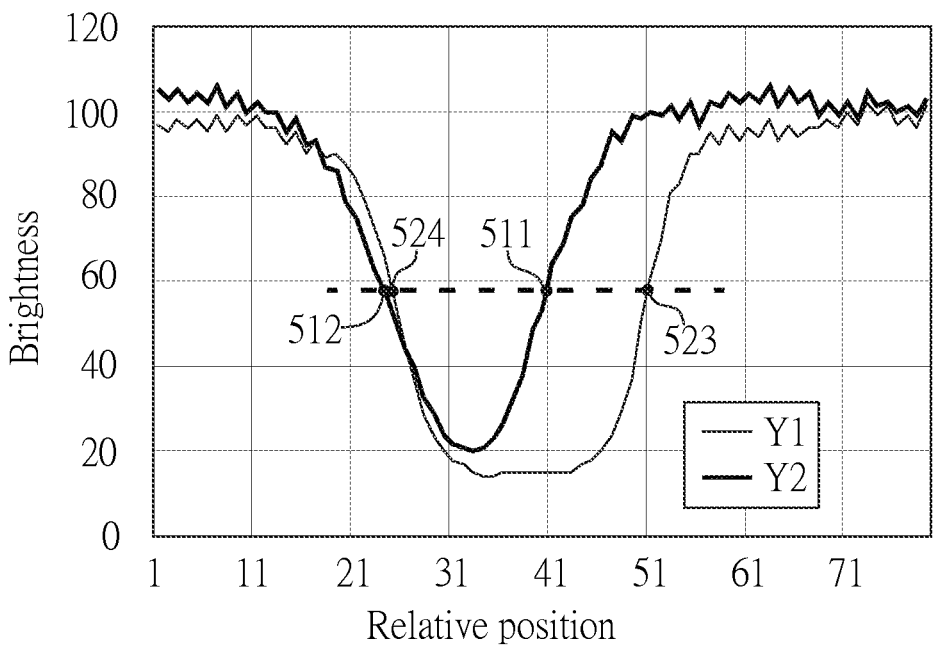

As shown in FIG. 7A, R1 indicates a wave of a cross-sectional line along the second direction X of the first protrusion pattern 521 shown in FIG. 6, and R2 indicates a wave of a cross-sectional line along the second direction X of the first main dark line 51 shown in FIG. 6, in a red pixel unit as a first sub-pixel unit. As shown in FIG. 7B, G1 indicates a wave of a cross-sectional line along the second direction X of the first protrusion pattern 521, and G2 indicates a wave of a cross-sectional line along the second direction X of the first main dark line 51, in a green pixel unit as a third sub-pixel unit. As shown in FIG. 7C, B1 indicates a wave of a cross-sectional line along the second direction X of the first protrusion pattern 521, and B2 indicates a wave of a cross-sectional line along the second direction X of the first main dark line 51, in a blue pixel unit as a second sub-pixel unit. In addition, as shown in FIG. 7D, Y1 indicates a wave of a cross-sectional line along the second direction X of the first protrusion pattern 521, and Y2 indicates a wave of a cross-sectional line along the second direction X of the first main dark line 51, in a yellow pixel unit as a fourth sub-pixel unit. As shown in FIGS. 7A to 7D, in all the red, green, blue and yellow pixel unit, the first deviation distance is different from the second deviation distance. In addition, as shown in FIGS. 7A and 7C, the first deviation distance or the second deviation distance in the red pixel unit is larger than that in the blue pixel unit; and in other words, the first distance or the second distance in the red pixel unit is larger than that in the blue pixel unit. As shown in FIGS. 7A and 7B, the first deviation distance or the second deviation distance in the red pixel unit is larger than that in the green pixel unit; and in other words, the first distance or the second distance in the red pixel unit is larger than that in the green pixel unit. Furthermore, as shown in FIGS. 7A and 7D, the first deviation distance or the second deviation distance in the red pixel unit is larger than that in the yellow pixel unit; and in other words, the first distance or the second distance in the red pixel unit is larger than that in the yellow pixel unit.

FIGS. 8A to 8D are diagrams showing measured transmittance of first main dark lines and metal pad patterns in red, green, blue and yellow sub-pixel units of the display panel according to Embodiment 2 of the present invention, wherein the TFT substrate used in the display panel of the present embodiment is shown in FIG. 2B, and the waves of the first main dark lines and metal pad patterns are measured by the aforementioned process. Similarly, the relations of the first deviation distance (first distance) and the second deviation distance (second distance) in sub-pixel units are similar to those described in Embodiment 1.

FIGS. 9A to 9D are diagrams showing measured transmittance of first main dark lines and metal pad patterns in red, green, blue and yellow sub-pixel units of the display panel according to Embodiment 3 of the present invention, wherein the TFT substrate used in the display panel of the present embodiment is shown in FIG. 2B, and the waves of the first main dark lines and metal pad patterns are measured by the aforementioned process. Similarly, the relations of the first deviation distance (first distance) and the second deviation distance (second distance) in sub-pixel units are similar to those described in Embodiment 1.

The relative deviation between the first main dark line and the metal pad pattern of Embodiments 1 to 3 are compared. In addition, as shown in FIGS. 4B, 5 and 6, the dark line pattern further comprises: a second main dark line 53 locating at an interface between two different alignment directions of the second photo-alignment layer 21 and extending along the second direction X. As shown in FIGS. 5 and 6, the metal pad patterns 52 are cross patterns, and have second protrusion patterns 522 extending along the second direction X. Herein, the relative deviation between the second main dark line 53 and the second protrusion patterns 522 is preferably identical to that between the first main dark line and the metal pad pattern illustrated above, and thus the detail descriptions thereof are not repeated again.

Figure 10:
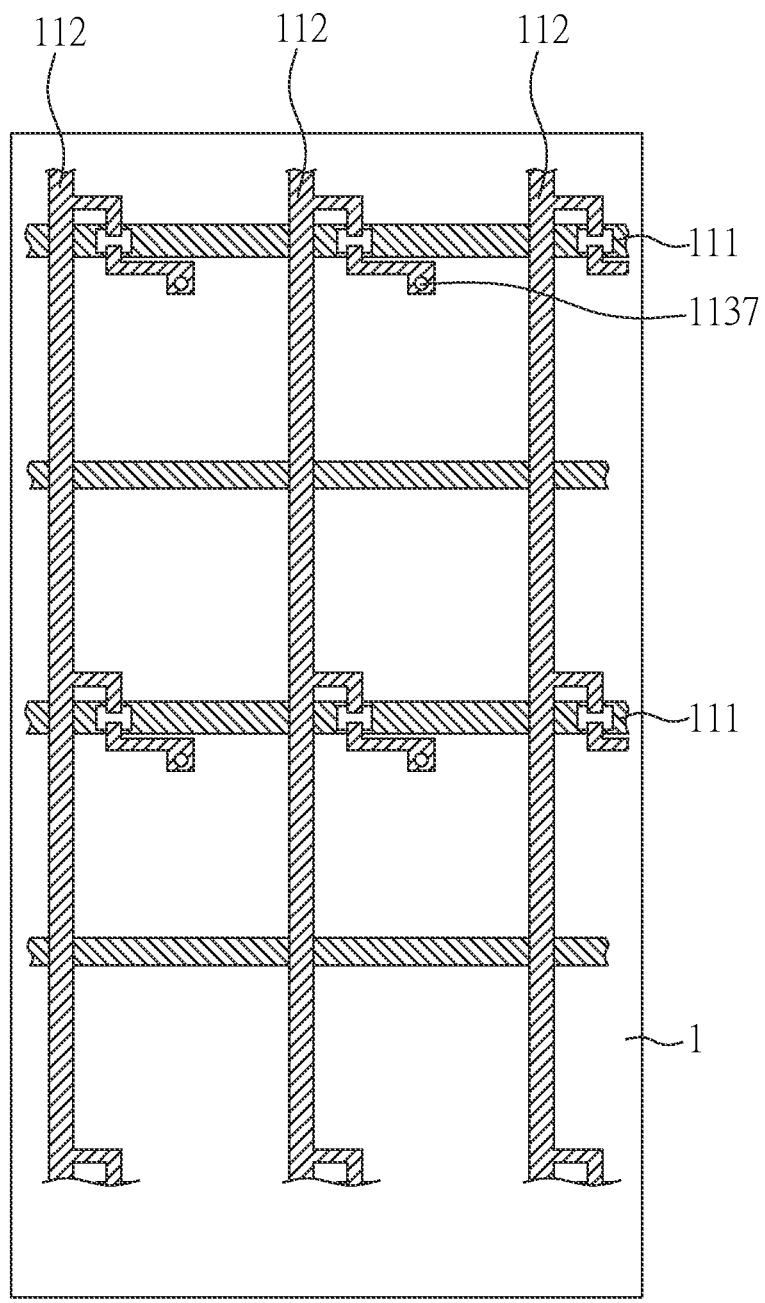
FIG. 10 is a schematic view showing a TFT substrate according to Comparative embodiment of the present invention.

FIG. 10 is a schematic view showing a TFT substrate according to Comparative embodiment of the present invention, wherein the structure thereof is similar to that shown in FIG. 2A, except that the TFT substrate of Comparative embodiment does not comprise metal pads.

Comparing the display panels equipped with the TFT substrates shown in FIG. 2A (Embodiment) and FIG. 10 (Comparative embodiment), the results shown in the following Table 1 and FIG. 11 can be obtained. In Table 1 and FIG. 11, the relation between the size of the metal pads and the contrast ratio is present, wherein the contrast ratio is defined by the following equation:

$$CR(\text{contrast\_ratio}) = \frac{W(\text{Brightness in bright state})}{D(\text{Brightness in dark state})}.$$

TABLE 1

| Area of metal pad (μm²) | Contrast ratio | |
| --- | --- | --- |
| | Embodiment | Comparative embodiment |
| 991 | 5946 | 6111 |
| 1237 | 5982 | 6193 |
| 2629 | 5708 | 6046 |

Figure 11:
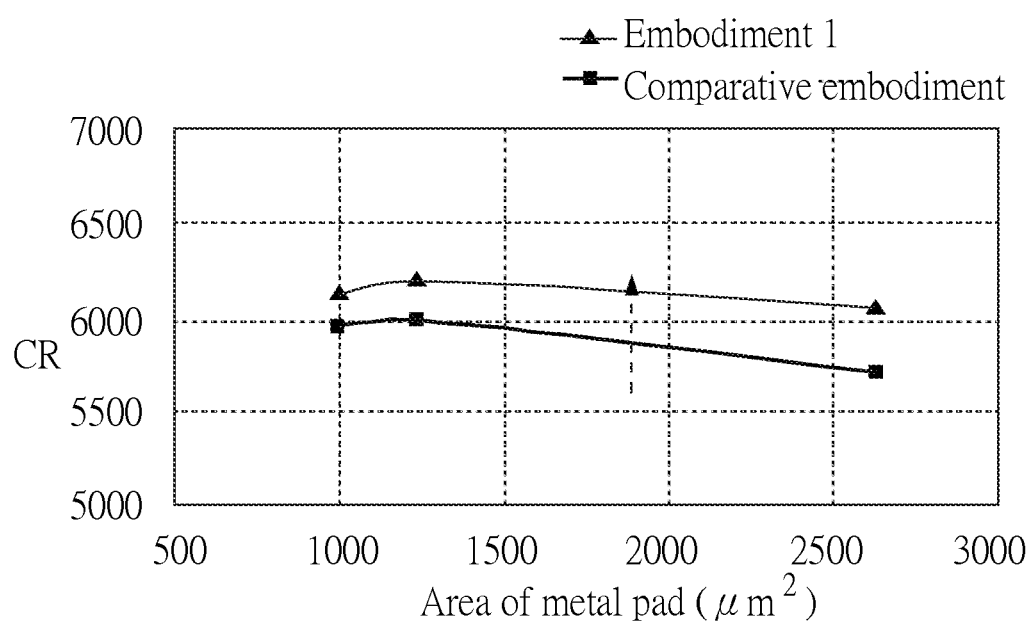
FIG. 11 is a diagram showing measured contrast of the display panels of Embodiment 1 and Comparative embodiment of the present invention.

As shown in FIG. 11 and Table 1, when the display panel is equipped with metal pads with protrusion portions, metal pad patterns with protrusion patterns corresponding thereto can be exhibited when light passes through the sub-pixel units. Thus, when light does not pass through the sub-pixel units and the display panel is present in the dark state, the brightness thereof can further be decreased, resulting in the transmittance thereof in the dark state decreased. Hence, the whole contrast ratio of the display panel can be enhanced, and the display performance thereof can further be improved. Meanwhile, the color of the sub-pixel units can further be changed by adjusting the first/second deviation distance or the first/second distance, and thus the display color of the display panel can be modified toward cold color or warm color.

Figure 12A:
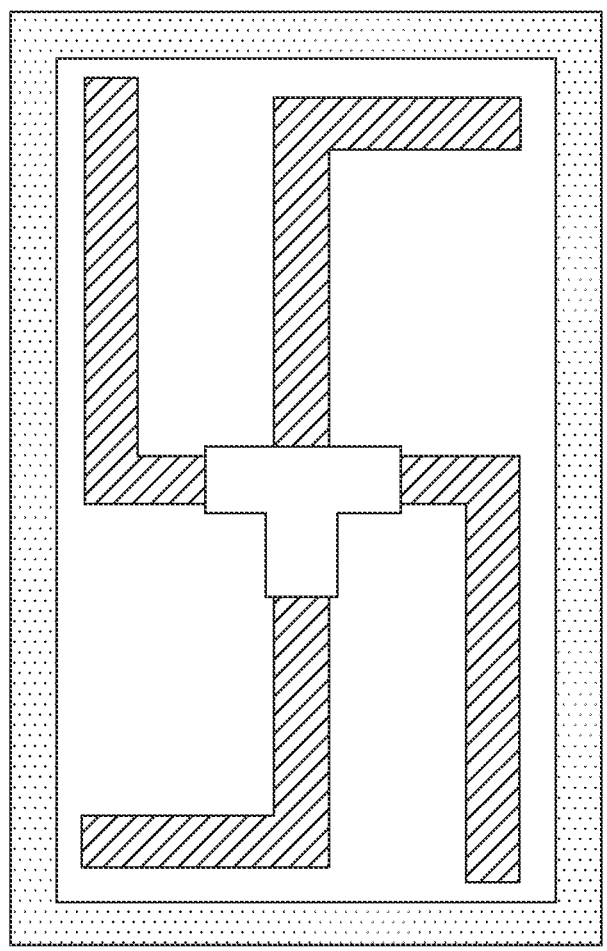
FIGS. 12A and 12B are enlarging views showing parts of a dark line patterns according to other preferred embodiments of the present invention.
Figure 12B:
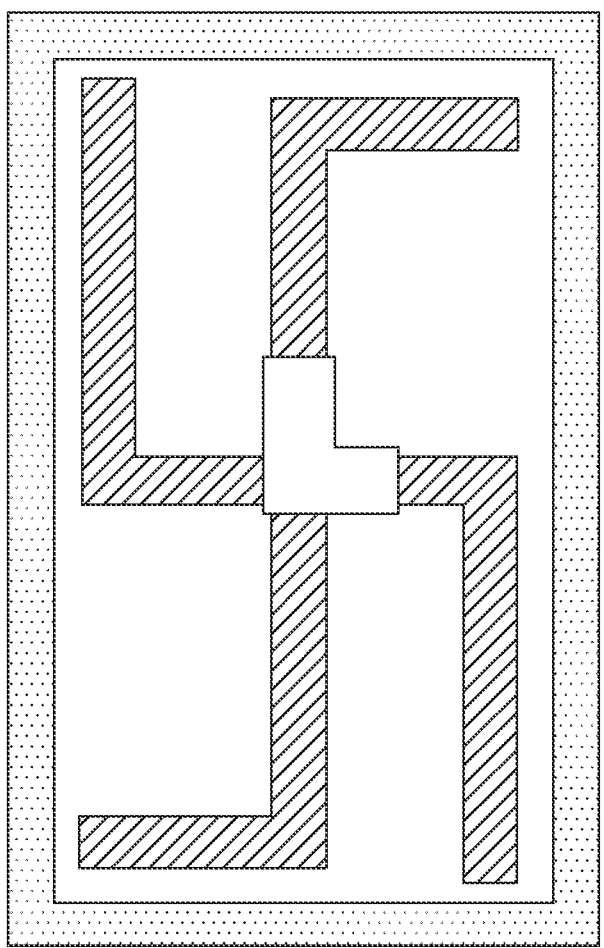

Furthermore, the shapes of the metal pads on the first substrate can further be modified to exhibit different metal pad patterns. For example, as shown in FIG. 12A, the metal pad patterns are uppercase T patterns in another preferred embodiment of the present invention; and as shown in FIG. 12B, the metal pad patterns are uppercase L patterns in further another preferred embodiment of the present invention. However, the shapes of the metal pad patterns are not limited to the aforementioned pattered, as long as the first/second deviation distance or the first/second distance satisfies the aforementioned relations to decrease the transmittance in the dark state.

Furthermore, the display device provided by the aforementioned embodiments of the present invention can be applied to any electronic device for displaying images, such as a mobile phone, a notebook, a camera, a video camera, a music player, a navigation system, or a television.

Although the present invention has been explained in relation to its preferred embodiment, it is to be understood that many other possible modifications and variations can be made without departing from the spirit and scope of the invention as hereinafter claimed.

What is claimed is:
1. A display panel, comprising:
   a first substrate with a plurality of pixel units disposed thereon, wherein the pixel units respectively comprise a plurality of sub-pixel units, and the sub-pixel units comprise a first sub-pixel unit being red color, a second sub-pixel unit being blue color, and a third sub-pixel unit being green color;
   a second substrate opposite to the first substrate;
   a liquid crystal layer disposed between the first substrate and the second substrate; and
   plural metal pads disposed on the first substrate, respectively having a first protrusion portion, and respectively corresponding to the sub-pixel units;
   wherein when light passes through the sub-pixel units, dark line patterns are exhibited, which respectively comprise:
   a first main dark line extending along a first direction, wherein two opposite edges of the first main dark line respectively have a first dark-line edge point and a second dark-line edge point at a cross-sectional line along a second direction perpendicular to the first direction; and a metal pad pattern corresponding to the first main dark line and having a first protrusion pattern extending along the first direction, wherein the first protrusion pattern corresponds to the first protrusion portion of the metal pad, two opposite edges of the first protrusion pattern respectively have a first metal-pad-pattern edge point and a second metal-pad-pattern edge point at another cross-sectional line along the second direction, the first metal-pad-pattern edge point is relatively close to the first dark-line edge point, and the second metal-pad-pattern edge point is relatively close to the second dark-line edge point, wherein a distance between elongation lines along the first direction on the basis of the first metal-pad-pattern edge point and the first dark-line edge point is defined as a first deviation distance, a distance between elongation lines along the first direction on the basis of the second metal-pad-pattern edge point and the second dark-line edge point is defined as a second deviation distance, and the first deviation distance is different from the second deviation distance, wherein one of the first deviation distance or the second deviation distance in the first sub-pixel unit is larger than one of the first deviation distance or the second deviation distance in the third sub-pixel unit.

2. The display panel as claimed in claim 1, wherein one of the first deviation distance or the second deviation distance in the first sub-pixel unit is larger than one of the first deviation distance or the second deviation distance in the second sub-pixel unit.

3. The display panel as claimed in claim 2, wherein the sub-pixel units further comprise a fourth sub-pixel unit being yellow color, and one of the first deviation distance or the second deviation distance in the first sub-pixel unit is larger than one of the first deviation distance or the second deviation distance in the fourth sub-pixel unit.

4. The display panel as claimed in claim 1, wherein the sub-pixel units further comprise a fourth sub-pixel unit being yellow color, and one of the first deviation distance or the second deviation distance in the first sub-pixel unit is larger than one of the first deviation distance or the second deviation distance in the fourth sub-pixel unit.

5. The display panel as claimed in claim 1, wherein the metal pad patterns corresponding to the sub-pixel units respectively are cross patterns, uppercase T patterns or uppercase L patterns.

6. The display panel as claimed in claim 1, wherein the metal pad pattern corresponding to at least one sub-pixel units further has a second protrusion pattern extending along the second direction.

7. The display panel as claimed in claim 6, wherein the metal pad patterns corresponding to the sub-pixel units further have second protrusion patterns extending along the second direction, respectively.

8. The display panel as claimed in claim 1, wherein an area of each metal pad pattern is respectively 5~15% of an area of the sub-pixel unit corresponding thereto.

9. The display panel as claimed in claim 1, further comprising a first photo-alignment layer and a second photo-alignment layer disposed on the pixel units, wherein the first photo-alignment layer has an alignment direction identical to the first direction and another alignment direction opposite to the first direction, and the second photo-alignment layer has an alignment direction identical to the second direction and another alignment direction opposite to the second direction.

10. A display panel, comprising:
a first substrate with a plurality of pixel units disposed thereon, wherein the pixel units respectively comprise a plurality of sub-pixel units, and the sub-pixel units comprise a first sub-pixel unit being red color, a second sub-pixel unit being blue color, and a third sub-pixel unit being green color;
a second substrate opposite to the first substrate;
a liquid crystal layer disposed between the first substrate and the second substrate; and
plural metal pads disposed on the first substrate, respectively having a first protrusion portion, and respectively corresponding to the sub-pixel units;
wherein when light passes through the sub-pixel units, dark line patterns are exhibited, which respectively comprise:
a first main dark line extending along a first direction, wherein the first main dark line has a first edge and a second edge opposite to the first edge, and both the first edge and the second edge extend along the first direction; and
a metal pad pattern corresponding to the first main dark line and having a first protrusion pattern extending along the first direction, wherein the first protrusion pattern corresponds to the first protrusion portion of the metal pad, the first protrusion pattern has a third edge and a fourth edge opposite to the third edge, both the third edge and the fourth edge extend along the first direction, the third edge is relatively close to the first edge, the fourth edge is relatively close to the second edge, a first distance between the first edge and the third edge along a second direction perpendicular to the first direction is different from a second distance between the second edge and the fourth edge along the second direction, wherein one of the first distance or the second distance in the first sub-pixel unit is larger than one of the first distance or the second distance in the third sub-pixel unit.

11. The display panel as claimed in claim 10, wherein one of the first distance or the second distance in the first sub-pixel unit is larger than one of the first distance or the second distance in the second sub-pixel unit.

12. The display panel as claimed in claim 11, wherein the sub-pixel units further comprise a fourth sub-pixel unit being yellow color, and one of the first distance or the second distance in the first sub-pixel unit is larger than one of the first distance or the second distance in the fourth sub-pixel unit.

13. The display panel as claimed in claim 10, wherein the sub-pixel units further comprise a fourth sub-pixel unit being yellow color, and one of the first distance or the second distance in the first sub-pixel unit is larger than one of the first distance or the second distance in the fourth sub-pixel unit.

14. The display panel as claimed in claim 10, wherein the metal pad patterns corresponding to the sub-pixel units respectively are cross patterns, uppercase T patterns or uppercase L patterns.

15. The display panel as claimed in claim 10, wherein the metal pad pattern corresponding to at least one sub-pixel units further has a second protrusion pattern extending along the second direction.

16. The display panel as claimed in claim 15, wherein the metal pad patterns corresponding to the sub-pixel units further have second protrusion patterns extending along the second direction, respectively.

17. The display panel as claimed in claim 10, wherein an area of each metal pad pattern is respectively 5~15% of an area of the sub-pixel unit corresponding thereto.

18. The display panel as claimed in claim 10, further comprising a first photo-alignment layer and a second photo-alignment layer disposed on the pixel units, wherein the first photo-alignment layer has an alignment direction identical to the first direction and another alignment direction opposite to the first direction, and the second photo-alignment layer has an alignment direction identical to the second direction and another alignment direction opposite to the second direction.

* * * * *